United States Patent
Gorodisher et al.

(10) Patent No.: US 9,228,112 B2
(45) Date of Patent: Jan. 5, 2016

(54) ANTICORROSION COATINGS

(71) Applicant: 3M INNOVATIVE PROPERTIES COMPANY, St. Paul, MN (US)

(72) Inventors: Ilya Gorodisher, Stillwater, MN (US); Mario A. Perez, Burnsville, MN (US); Werner M. Grootaert, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 464 days.

(21) Appl. No.: 13/755,650

(22) Filed: Jan. 31, 2013

(65) Prior Publication Data

US 2013/0209812 A1    Aug. 15, 2013

Related U.S. Application Data

(60) Provisional application No. 61/597,192, filed on Feb. 10, 2012.

(51) Int. Cl.
| | |
|---|---|
| *C09D 179/04* | (2006.01) |
| *C09J 179/04* | (2006.01) |
| *C08L 79/04* | (2006.01) |
| *C08K 5/17* | (2006.01) |
| *C08K 5/13* | (2006.01) |

(52) U.S. Cl.
CPC ............ *C09D 179/04* (2013.01); *C08L 79/04* (2013.01); *C09J 179/04* (2013.01); *C08K 5/13* (2013.01); *C08K 5/17* (2013.01); *Y10T 428/31681* (2015.04)

(58) Field of Classification Search
CPC ...... C08L 79/04; C09J 179/04; C09D 179/04; C08K 5/17; C08K 5/13
USPC ............................ 524/500; 525/417; 428/421
See application file for complete search history.

(56) References Cited

U.S. PATENT DOCUMENTS

| | | | |
|---|---|---|---|
| 3,018,262 A | 1/1962 | Schroeder | |
| 3,298,998 A | 1/1967 | McConnell | |
| 3,496,250 A | 2/1970 | Czerwinski | |
| 4,501,864 A * | 2/1985 | Higginbottom | ............... 525/484 |
| 4,808,565 A | 2/1989 | Whitcomb | |
| 4,902,667 A | 2/1990 | Whitcomb | |
| 5,262,490 A | 11/1993 | Kolb | |
| 5,478,652 A | 12/1995 | Grootaert | |
| 5,500,042 A | 3/1996 | Grootaert | |
| 5,543,516 A | 8/1996 | Ishida | |
| 5,859,153 A | 1/1999 | Kirk | |
| 6,207,786 B1 | 3/2001 | Ishida | |
| 6,376,080 B1 | 4/2002 | Gallo | |
| 6,890,995 B2 | 5/2005 | Kolb | |
| 6,911,512 B2 | 6/2005 | Jing | |
| 6,943,228 B2 | 9/2005 | Grootaert | |
| 7,041,772 B2 | 5/2006 | Aizawa | |
| 7,053,138 B2 | 5/2006 | Magendie | |
| 7,517,925 B2 | 4/2009 | Dershem | |
| 7,847,034 B2 | 12/2010 | Burns | |
| 8,003,750 B2 * | 8/2011 | Setiabudi | ...................... 528/210 |
| 8,410,202 B1 * | 4/2013 | Wu et al. | ...................... 524/104 |
| 2010/0312004 A1 | 12/2010 | Gorodisher | |

FOREIGN PATENT DOCUMENTS

| | | |
|---|---|---|
| WO | WO 97-48746 | 12/1997 |
| WO | WO 2008/095837 | 8/2008 |
| WO | WO 2008/095850 | 8/2008 |
| WO | WO 2012-134731 | 10/2012 |

OTHER PUBLICATIONS

PCT International Search Report, International Application No. PCT/US2013/022749.
Bonnaud, "Use of reactive polyetherimide to modify epoxy thermosets. I-Synthesis of an amino-grafted polyetherimide", European Polymer Science Journal, Nov. 2004, vol. 40, No. 11, pp. 2637-2643.
Fainleb, "Structure development in aromatic polycyanurate networks modified with hydroxyl-terminated polyethers", Polymer, Sep. 2001, vol. 42, No. 20, pp. 8361-8372.
Ghosh, "Polybenzoxazine—new high performance thermosetting resins: synthesis and properties", Progress in Polymer Science, Nov. 2007, vol. 32, pp. 1344-1391.
Kimura, "New Thermosetting Resin from Bisphenol A-based Benzoxazine and Bisoxazoline", Journal of Applied Polymer Science, Jun. 20, 1999, vol. 72, pp. 1551-1558.
Liu, "Novel thermosetting resins based on 4-(N-maleidophenyl)glycidylether: II. Bismaleimides and polybismaleimides", Polymer, Mar. 2004, vol. 45, No. 6, pp. 1797-1804.
Rimdusit, "Development of new class of electronic packaging materials based on ternary systems of benzoxazine, epoxy, and phenolic resins", Polymer, Oct. 2000, vol. 41, No. 22, pp. 7941-7949.
Robinette, "Toughening of vinyl ester resin using butadiene-acrylonitrile rubber modifiers", Polymer, Aug. 19, 2004, vol. 45, No. 18, pp. 6143-6154.

* cited by examiner

*Primary Examiner* — Michael M Bernshteyn
(74) *Attorney, Agent, or Firm* — Kent S. Kokko

(57) ABSTRACT

Curable compositions comprising a benzoxazine component, a polyamine component and an ortho-dihydroxyaryl component are described. The compositions may be cured to produce compositions useful in coating, sealants, adhesive and many other applications.

22 Claims, 1 Drawing Sheet

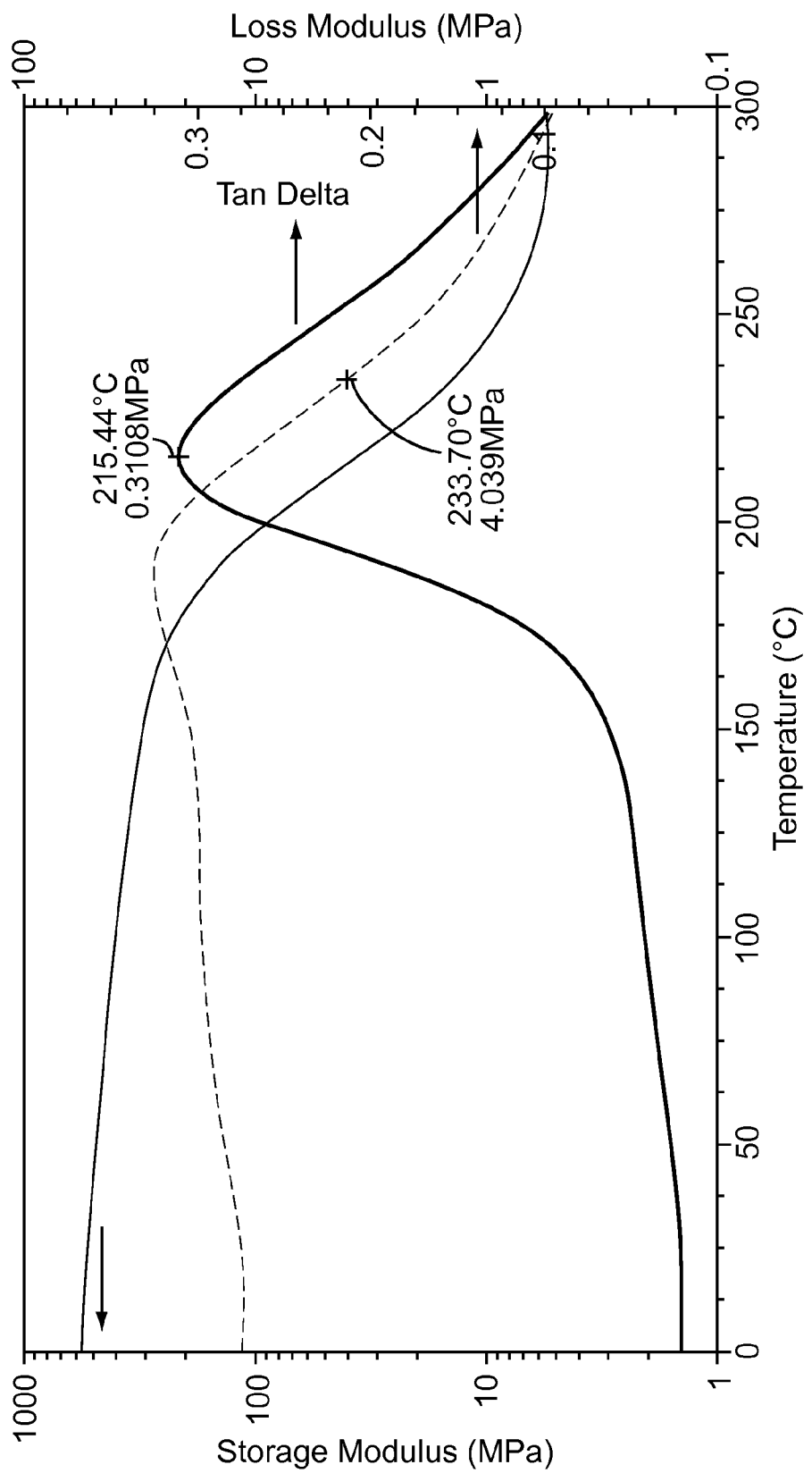

ANTICORROSION COATINGS

CROSS REFERENCE TO RELATED APPLICATIONS

This application claims priority from U.S. Provisional Application Ser. No. 61/597,192, filed Feb. 10, 2012, the disclosure of which is incorporated by reference in its entirety herein.

FIELD OF THE INVENTION

The present disclosure is directed to novel oligomers and polymers derived from the reaction of benzoxazine compounds with a mixture of amine compounds and ortho-dihydroxyaryl compounds. The compositions are useful in coating, sealant, adhesive and many other applications.

BACKGROUND

Benzoxazines and compositions containing benzoxazines are known (see for example, U.S. Pat. Nos. 5,543,516 and 6,207,786 to Ishida, et al.; S. Rimdusit and H. Ishida, "Development of New Class of Electronic Packaging Materials Based on Ternary Systems of Benzoxazine, Epoxy, and Phenolic Resins", Polymer, 41, 7941-49 (2000); and H. Kimura, et al., "New Thermosetting Resin from Bisphenol A-based Benzoxazine and Bisoxazoline", J. App. Polym. Sci., 72, 1551-58 (1999).

U.S. Pat. No. 4,501,864 (Higginbottom) reports a curable composition comprising a poly(3,4-dihydro-3-substituted-1,3 benzoxazine) and a reactive polyamine, wherein the polyamine is at least difunctional and its reactive groups are primary or secondary amine, and wherein the poly(dihydrobenzoxazine) is the reaction product of about one equivalent of a primary amine, about one equivalent of a phenol and about two equivalents of formaldehyde.

U.S. Pat. No. 7,517,925 (Dershem et al.) describes benzoxazine compounds and thermosetting resin compositions prepared therefrom. The compositions are said to be useful for increasing adhesion at interfaces within microelectronic packages and low shrinkage on cure and low coefficient of thermal expansion (CTE).

U.S. Pat. No. 7,053,138 (Magendie et al.) describes compositions comprising benzoxazines and thermoplastic or thermoset resins in the manufacture of prepregs and laminates. The compositions are said to yield flame-proofed laminating resins that have high glass transition temperatures.

U.S. Pat. No. 6,376,080 (Gallo) describes a method of preparing a polybenzoxazine which includes heating a molding composition including a benzoxazine and a heterocyclic dicarboxylic acid to a temperature sufficient to cure the molding composition, thereby forming the polybenzoxazine. The compositions are said to have near-zero volume change after post cure.

U.S. Pat. No. 6,207,786 (Ishida et al.) states that the polymerization of benzoxazine monomers to a polymer is believed to be an ionic ring opening polymerization which converts the oxazine ring to another structure, e.g., linear polymer or larger heterocyclic rings.

U.S. 2010/312004 (Gorodisher et al.) describes benzoxazine-thiol adducts which may be cured to produce compositions useful in coatings, sealants, adhesives, and other applications. Similarly, U.S. Pat. No. 7,847,034 (Burns et al.) describes adducts useful for improving the toughness and curable compositions using such toughening adducts.

SUMMARY

The present disclosure is directed to a novel curable composition comprising a benzoxazine component, a polyamine component and an ortho-dihydroxyaryl component. Further, the present disclosure is directed to a method of preparing the adducts, which comprises reacting a benzoxazine compound with a primary or secondary polyamine component and an ortho-dihydroxyaryl component. The compositions may be cured to produce cured compositions useful in coating, sealants, adhesive and many other applications. The present disclosure further provides a curable composition comprising a benzoxazine compound, a primary or secondary polyamine component and an ortho-dihydroxyaryl component, which when cured is useful in adhesive, coating and bonding applications.

In some embodiments, the cured compositions are useful as a primer or adhesion-promoting layer for fluoropolymers, including fluoroelastomers. A substrate may be provided with a cured benzoxazine coating of this invention, then provided with a coating of a fluoropolymer. The fluoropolymer may be cured in situ to form a strong cohesive bond to the benzoxazine coating. In some embodiments a coating of the benzoxazine coating composition and a coating of the fluoropolymer may be simultaneously cured.

In other embodiments, the cured compositions are useful as corrosion-resistant coatings and have application where metal structures become subject to oxidative corrosion and ultimately fail to fulfill their intended purpose. Examples of failure by metal corrosion include deterioration of heat exchanger elements, corrosion of pipeline distribution systems and especially the gradual disintegration of steel used for reinforcing concrete structures such as bridge decks and frames which support a wide range of modern buildings. The instant benzoxazine compositions are particularly useful in providing corrosion protection to substrates exposed to high operating temperatures, such as in excess of 180° C.

In the process of preparing the benzoxazine adducts, the polyamine component comprises two or more amine equivalents, and each of the additional components may be mono- or higher functionality. benzoxazine may be a mono- or higher benzoxazine, and the ortho-dihydroxyaryl component may be a mono-ortho-dihydroxyaryl compound, or may be an oligomer or polymer having two or more ortho-dihydroxyaryl groups, either in-chain or pendent from the polymer chain. It will be understood that a primary amine has two amine equivalents and a secondary amine has one amine equivalents.

As used herein the term "benzoxazine" is inclusive of compounds and polymers having the characteristic benzoxazine ring. In the illustrated benzoxazine group, R is the residue of a mono- or polyamine.

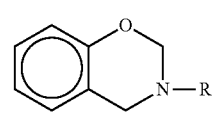

I where R represents a (hetero)hydrocarbyl groups, including (hetero)alkyl and (hetero)aryl groups.

As used herein, "alkyl" and "alkylene" mean the monovalent and divalent residues remaining after removal of one and two hydrogen atoms, respectively, from a linear or branched chain hydrocarbon having 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl. and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

"aryl" and "arylene" mean the monovalent and divalent residues remaining after removal of one and two hydrogen atoms, respectively, from an aromatic compound (single ring and multi- and fused-rings) having 5 to 12 ring atoms and includes substituted aromatics such as lower alkaryl and aralkyl, lower alkoxy, N,N-di(lower alkyl)amino, nitro, cyano, halo, and lower alkyl carboxylic ester, wherein "lower" means $C_1$ to $C_4$.

Unless otherwise noted, aryl and heteroaryl groups may be mono- or polyvalent.

As used herein "(hetero)hydrocarbyl" is inclusive of hydrocarbyl alkyl and aryl groups, and heterohydrocarbyl heteroalkyl and heteroaryl groups. Heterohydrocarbyl may optionally contain one or more catenary (in-chain) functional groups including ester, amide, urea, urethane and carbonate functional groups. Unless otherwise indicated, the non-polymeric (hetero)hydrocarbyl groups typically contain from 1 to 60 carbon atoms. Some examples of such (hetero)hydrocarbyls as used herein include, but are not limited to methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl" and "heteroaryl" supra.

As used herein the term "residue" is used to define that (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of hexamethylene diamine, $H_2N$—$C_6H_{12}$—$NH_2$ is the divalent alkyl —$C_6H_{12}$—. The residue of phenylene diamine $H_2N$—$C_6H_4$—$NH_2$, is the divalent aryl —$C_6H_4$—. The residue of diamino-polyethylene glycol, $H_2N$—$(C_2H_4O)_{1-20}$—$C_2H_4$—$NH_2$, is the divalent (hetero) hydrocarbyl polyethylene glycol —$(C_2H_4O)_{1-20}$—$C_2H_4$—.

BRIEF DESCRIPTION OF THE DRAWINGS

FIG. 1 is the dynamic mechanical analysis of the composition of Example 1.

DETAILED DESCRIPTION

In the preparation of the benzoxazine-polyamine adducts, any benzoxazine compound may be used. Benzoxazines may be prepared by combining a phenolic compound, and aliphatic aldehyde, and a primary amine compound. U.S. Pat. No. 5,543,516 (Ishida), hereby incorporated by reference, describes a solventless method of forming benzoxazines. U.S. Pat. No. 7,041,772 (Aizawa et al.) describes a process for producing a benzoxazine resin which comprises the steps of reacting a phenol compound, an aldehyde compound and a primary amine in the presence of an organic solvent to synthesize a benzoxazine resin and removing generated condensation water and the organic solvent from a system under heating and a reduced pressure. Other suitable reaction schemes to produce mono-, di- and higher-functional benzoxazines are described in N. N. Ghosh et al., *Polybenzoxazine-new high performance thermosetting resins: synthesis and properties, Prog. Polym. Sci.* 32 (2007), pp. 1344-1391. One suitable method of producing the starting benzoxazine compounds is illustrated by the following reaction scheme:

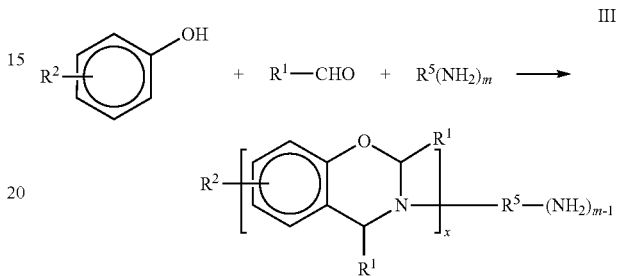

III wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound, $R^5(NH_2)_m$, where m is 1-6; and
x is at least 1. It will be understood that the free amino groups depicted may further react to produce additional benzoxazine groups.

A monophenol is illustrated for simplicity. Mono- or polyphenolic compounds may be used. The phenolic compound may be further substituted without limitation is desired. For example, the 3, 4, and 5 positions of the phenolic compound may be hydrogen or substituted with other suitable substituents such as alkyl, cycloalkyl, heterocycloalkyl, aryl, heteroaryl, aralkyl, heteroaralkyl, alkoxy, alkoxyalkylene, hydroxylalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. Desirably at least one of the positions ortho to the hydroxyl group is unsubstituted to facilitate benzoxazine ring formation.

With respect to the $R^2$ group of Formula III, numerous phenolic compounds are contemplated. $R^2$ may be an H, a covalent bond "—" which represents a biphenyl-type phenolic compounds, or $R^2$ may be a divalent aliphatic group linking aryl rings. For example, $R^2$ may be a divalent isopropyl group, derived from bisphenol-A, generally illustrated as follows:

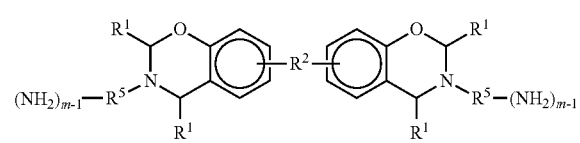

IV where
each $R^1$ is H or an alkyl group, and is the residue of an aliphatic aldehyde, $R^2$ is H, a covalent bond, or a polyvalent (hetero)hydrocarbyl group, preferably H, a covalent bond or a divalent alkyl group; $R^5$ is the (hetero)hydrocarbyl residue of a primary amino compound, $R^5(NH_2)_m$, where m is 1-6. It will be understood that the free amino groups depicted may further react to produce additional benzoxazine groups.

The aryl ring of the phenolic compound may be a phenyl ring as depicted, or may be selected from naphthyl, biphenyl, phenanthryl, and anthracyl. The aryl ring of the phenolic compound may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol; cresol; 2-bromo-4-methylphenol; 2-allyphenol; 4-aminophenol; and the like. Examples of difunctional phenols (polyphenolic compounds) include phenolphthalein; biphenol, 4-4'-methylene-di-phenol; 4-4'-dihydroxybenzophenone; bisphenol-A; 1,8-dihydroxyanthraquinone; 1,6-dihydroxynaphthalene; 2,2'-dihydroxyazobenzene; resorcinol; fluorene bisphenol; and the like. Examples of trifunctional phenols comprise 1,3,5-trihydroxy benzene and the like.

The aldehyde reactants used in preparing the benzoxazine starting materials include formaldehyde; paraformaldehyde; polyoxymethylene; as well as aldehydes having the general formula $R^1CHO$, where $R^1$ is H or an alkyl group, including mixtures of such aldehydes, desirably having from 1 to 12 carbon atoms. The $R^1$ group may be linear or branched, cyclic or acyclic, saturated or unsaturated, or combinations thereof. Other useful aldehydes include crotonaldehyde; acetaldehyde; propionaldehyde; butyraldehyde; and heptaldehyde.

Amino compounds useful in preparing the starting benzoxazine can be substituted or unsubstituted, mono-, di-substituted or higher (hetero)hydrocarbyl amines having at least one primary amine group. The amines may be aliphatic or aromatic amines. It can be substituted, for example, with groups such as alkyl, cycloalkyl, heterocycloalkyl, aryl, heteroaryl, aralkyl, or heteroaralkyl. It has been observed that benzoxazines derived from aromatic amines, such as aniline, are less reactive toward the thiol reactants than benzoxazines derived from aliphatic amines as indicated, for example by the corresponding reaction temperatures.

Amines useful in the preparation of the starting benzoxazine compounds include those of the formula:

$$R^5(NH_2)_m \quad \quad V$$

and include (hetero)hydrocarbyl monoamines and polyamines. $R^5$ may be (hetero)hydrocarbyl group that has a valence of m, and is the residue of a mono-, di- or higher amine having at least one primary amine group. $R^5$ can be an alkyl, a cycloalkyl or aryl and m 1 to 6. The $R^5$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen.

In one embodiment, $R^5$ comprises a non-polymeric aliphatic, cycloaliphatic, aromatic or alkyl-substituted aromatic moiety having from 1 to 30 carbon atoms. In another embodiment, $R^5$ comprises a polymeric polyoxyalkylene, polyester, polyolefin, poly(meth)acrylate, polystyrene or polysiloxane polymer having pendent or terminal reactive —$NH_2$ groups. Useful polymers include, for example, amine-terminated oligo- and poly-(diaryl)siloxanes and (dialkyl)siloxane amino terminated polyethylenes or polypropylenes, and amino terminated poly(alkylene oxides).

Any primary amine may be employed. Useful monoamines include, for example, methyl-, ethyl-, propyl-, hexyl-, octyl, dodecyl-, dimethyl-, methyl ethyl-, and aniline. The term "di-, or polyamine," refers to organic compounds containing at least two primary amine groups. Aliphatic, aromatic, cycloaliphatic, and oligomeric di- and polyamines all are considered useful in the practice of the invention. Representative of the classes of useful di- or polyamines are 4,4'-methylene dianiline, 3,9-bis-(3-aminopropyl)-2,4,8,10-tetraoxaspiro[5,5]undecane, and polyoxyethylenediamine. Useful diamines include N-methyl-1,3-propanediamine; N-ethyl-1,2-ethanediamine; 2-(2-aminoethylamino)ethanol; pentaethylenehexaamine; ethylenediamine; N-methylethanolamine; and 1,3-propanediamine.

Examples of useful polyamines include polyamines having at least three amino groups, wherein at least one of the three amino groups are primary, and the remaining may be primary, secondary, or a combination thereof. Examples include $H_2N(CH_2CH_2NH)_{1-10}H$, $H_2N(CH_2CH_2CH_2CH_2NH)_{1-10}H$, $H_2N(CH_2CH_2CH_2CH_2CH_2CH_2NH)_{1-10}H$, $H_2N(CH_2)_3NHCH_2CH=CHCH_2NH(CH_2)_3NH_2$, $H_2N(CH_2)_4NH(CH_2)_3NH_2$, $H_2N(CH2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2NH(CH_2)_2NH_2$, and $N(CH_2CH_2NH_2)_3$, and polymeric polyamines such as linear or branched (including dendrimers) homopolymers and copolymers of ethyleneimine (i.e., aziridine). Many such compounds can be obtained, or are available, from general chemical suppliers such as, for example, Aldrich Chemical Company, Milwaukee, Wis. or Pfaltz and Bauer, Inc., Waterbury, Conn.

Many di- and polyamines, such as those just named, are available commercially, for example, those available from Huntsman Chemical, Houston, Tex. The most preferred di- or polyamines include aliphatic di- and triamines or aliphatic di- or polyamines and more specifically compounds with two or three primary amino groups, such as ethylene diamine, hexamethylene diamine, dodecanediamine, and the like.

Other useful amines include amino acids such as glycine, alanine, and leucine and their methyl esters, aminoalcohols such as ethanolamine, 3-aminopropanol, and 4-aminobutanol, polyaminoethers containing ethylene glycol and diethylene glycol (such as Jeffamine™ diamines), and alkenyl amines such as diallylamine and allylmethylamine.

For many embodiments, it is preferable that the amine of Formula V be selected from aromatic-containing amines, i.e. $R^5$ is an aryl, alkyaryl or aralkyl group. Such benzoxazine-polyamine adducts, where the polyamine has an aromatic groups, has generally performance when exposed to higher temperatures.

It will be understood that monoamines will cyclize with the aldehyde and phenolic compound to produce mono-benzoxazine compounds, while di- or higher amines will cyclize to produce di- and poly-benzoxazine compounds: For example, a diamine (m=2 in the Scheme VI below) will produce a di-benzoxazine.

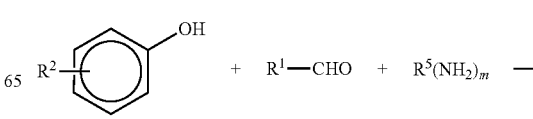

VI

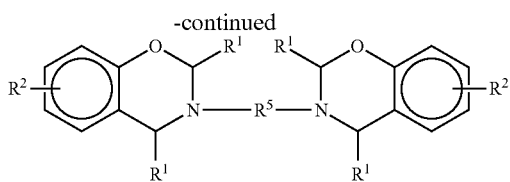

wherein each $R^1$ is H or an alkyl group, and $R^1$ is the residue of an aliphatic aldehyde;
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound and m is 2.

If a polyamine and a polyphenol are used in the preparation, a polybenzoxazine will result. As used herein the term "polybenzoxazine" will refer to compounds having two or more benzoxazine rings. The term "poly(benzoxazine)" will refer to polymers resulting from acid-catalyzed ring-opening and homopolymerization of benzoxazine compounds.

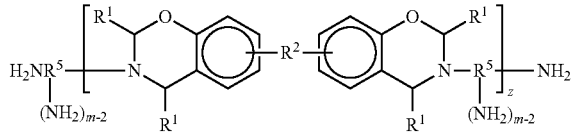

wherein,
each of $R^1$ is H or an alkyl group;
$R^2$ is a covalent bond, or a divalent (hetero)hydrocarbyl group;
m is 2-4;
z is at least 2;
$R^5$ is the divalent (hetero)hydrocarbyl residue of a primary diamino compound.

The benzoxazine ring is ring-opened by a polyamine compound. Useful amine compounds correspond to primary and secondary amines of the formula:

$$R^{10}(NHR^9)_p, \quad \text{XII}$$

and include primary and secondary (hetero)hydrocarbyl monoamines and polyamines. $R^{10}$ may be (hetero)hydrocarbyl group that has a valence of p, and is the residue of a mono-, di- or higher amine having at least one primary amine group. $R^{10}$ can be a di- or higher-valent alkyl, a cycloalkyl or aryl, or combination thereof, including alkaryl and aralkyl, and p is 2 to 6. The $R^{10}$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen. Each $R^9$ is independently H or a hydrocarbyl group, including aryl and alkyl.

It will be clear to one skilled in the art that many of the same amines used in the preparation of the benzoxazines (supra) will also be useful in the ring-opening reaction. In many embodiments, it is preferred that the amine of Formula XII be an aromatic amine, including including alkaryl and aralkyl.

In some embodiments the polyamine compound may be selected from amidine compounds or guanidine compounds having at least two amine equivalents. Such compounds are of the general formulae:

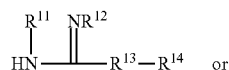

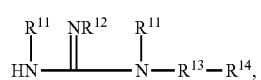

wherein
each $R^{11}$ is independently an alkyl group of 1 to 14 carbon atoms, a cycloalkyl group of 3 to 12 carbon atoms, or an aryl group of 5 to 12 ring atoms,
each $R^{12}$ is H of $C_1$-$C_4$ alkyl;
each $R^{13}$ is an $C_1$-$C_{12}$ alkylene or an arylene of 5 to 12 ring atoms, and
$R^{14}$ is H or a functional group selected from amide, ester, nitrile, nitro, sulfide, sulfoxide, sulfone, disulfide, azide, isothiocyanate, amine, hydroxyl, mercaptan, ether, urethane, quaternary ammonium and phosphonium, halogen, silyl, silyloxy, and the like, wherein the functional groups requiring substituents are substituted with hydrogen or alkyl or aryl groups where appropriate. For example, if $R^{14}$ is an ether, the ether may be substituted with an $R^{13}$ group to yield —O—$R^{13}$ group. If $R^{14}$ is an amide, the amide may be represented as —CO—N($R^{13}$)$_2$.

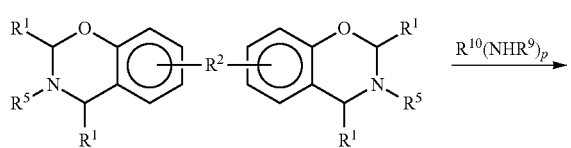

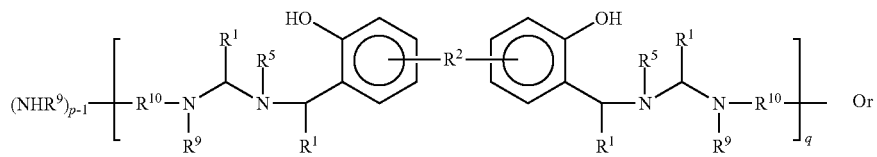

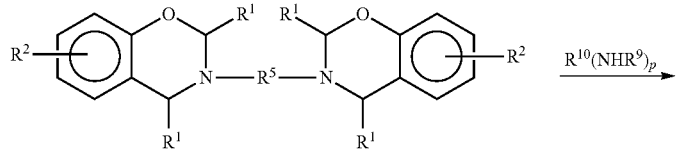

-continued

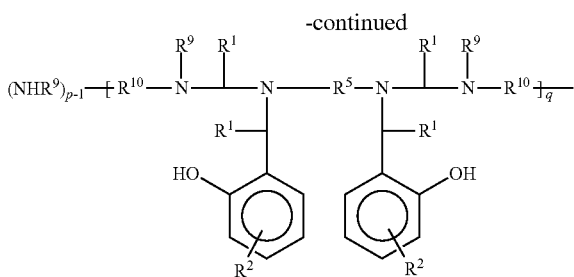

where
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound
$R^{10}$ is the (hetero)hydrocarbyl group,
$R^9$ is H or a hydrocarbyl group, including aryl and alkyl,
p is 1 to 6;
q is at least 1, preferably at least 2.

The mixture of amine and benzoxazine compounds is used in amounts such that the molar ratio of amine groups to the benzoxazine groups is from 2:1 to 1:10, preferably 1:1 to 1:2. It will be understood that a primary amine has two molar equivalents and a secondary amine has one molar equivalent.

If desired an acid catalyst may be used to promote the ring-opening of the benzoxazine. Lewis and Brönsted acids accelerate the amine cure of benzoxazine adducts as indicated by the lower onset of polymerization temperature and reduced temperature of the peak of the exotherm corresponding to the cure. Suitable acid catalysts include, but are not limited to: strong inorganic acids such as hydrochloric acid, sulfuric acid, phosphoric acid, and the like; and organic acids such as acetic acid, para-toluene sulfonic acid, and oxalic acid. Acid catalysts may be used in amounts of 2 wt. % or less, preferably 1 wt. % or less, most preferably 0.5 wt. % or less, relative to the amounts of benzoxazine reactants.

In some embodiments it is preferable to have an excess of benzoxazine, as an unreacted benzoxazine will homopolymerize to form a coextensive mixture or polymer network of benzoxazine/amine adduct and poly(benzoxazines), as illustrated below. In such embodiments, the molar amounts ratio of benzoxazine groups to the sum of amine and epoxy groups is about 1.1:1 to 50:1. Generally, benzoxazines derived from aromatic amines (R=aryl) are more ready homopolymerized than aliphatic amines. Superacids, such as pentafluoroantimonic acids may be used to effect the homopolymerization of the benzoxazines.

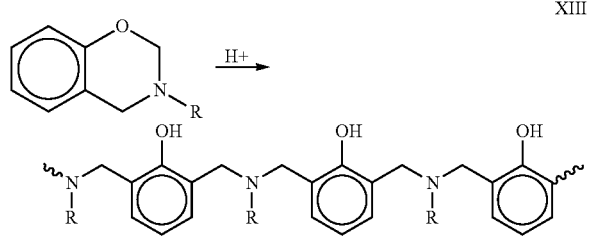

XIII

The curable composition further comprises an ortho-dihydroxyaryl component, which include monocatechols or polycatechols. "Polycatechol" molecules containing more than one o-dihydroxyaryl moiety, the moieties being connected by an organic connecting link which does not provide electronic interaction between the moieties, such as a saturated organic group (e.g., alkyl, cycloalkyl). This group includes bis-catechols. It has been found that the addition of such compounds to the curable benzoxazine composition significantly enhances the adhesion of the composition to substrates. It is believed that such compounds function as chealting agents on metal substrates. The ortho-dihydroxy aryl component is present between 0.5% and 20% by wt of the total composition, most pref. 1% to 10% by weight.

Useful monocatechols are of the formula:

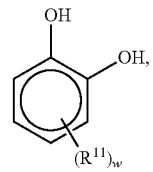

where each $R^{11}$ is independently H, or an $C_1$-$C_{12}$ alkyl or aryl, and w is 0 to 4.

Examples of suitable ortho-dihydroxyaryl compounds useful in the curable composition include but are not limited to those selected from the group consisting of catechol and substituted catechols. Examples of suitable substituents include alkyl alkoxy, aryl, halogen, and other substituents which would not interfere with the reaction. Specific examples include methylcatechols, (tert)butylcatechols, ethylcatechols, isopropylcatechols, butylcatechols, (tert)butylcatechols, amylcatechols, (tert)amylcatechols, benzylcatechols, phenethylcatechols, phenylcatechols, fluorocatechols, chlorocatechols, bromocatechols, methoxycatechols, ethoxycatechols, formylcatechols, allylcatechols, ortho-dihydroxynaphthalenes. Other useful ortho-dihydroxyaryl compounds include 1,2- and 2,3-dihydroxynapthalene, and the corresponding higher ortho-dihydroxyaryl compounds.

The ortho-dihydroxyaryl compounds may also include oligomers and polymers having ortho-dihydroxyaryl groups. This includes novolak resins derived from a catechol, an aldehyde such as formaldehyde, and an optional monophenol. Reference may be made to U.S. Pat. No. 5,859,513 (Kirk et al.) incorporated herein by reference.

Molecules containing more than two catechol groups are also acceptable, as long as the connecting linkage between the catechols meets the above requirements. Thus in formulae IV, and V oligomers or polymers are illustrated which are useful in this invention

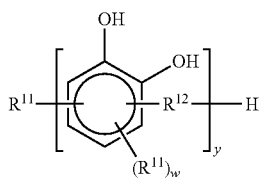

IV where each $R^{11}$ is independently H, or an $C_1$-$C_{12}$ alkyl or aryl, w is 0 to 4; and
$R^{12}$ is a divalent hydrocarbyl group, and
y is at least 2.
Or

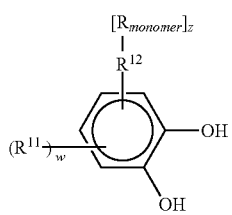

V

Where each $R^{11}$ is independently H, or an $C_1$-$C_{12}$ alkyl or aryl, w is 0 to 4;
$R^{12}$ is a divalent hydrocarbyl group,
z is at least 2, and
$R_{monomer}$ a unit in a polymer chain chosen from hydrocarbons, alkyd, acrylic, polyester, phenol-formaldehyde resins etc.

A number of bis-catechols are available commercially e.g., nordihydroguaiaretic acid. Other useful catechol are disclosed in U.S. Pat. No. 4,902,667 (Whitcomb), incorporated herein by reference.

The benzoxazine composition may further comprise an epoxy resin, which may improved the moisture-resistance of the cured coatings. Polyepoxy compounds which can be utilized in the composition of the invention include both aliphatic and aromatic polyepoxides, but glycidyl aliphatic epoxides are preferred. The aromatic polyepoxides are compounds containing at least one aromatic ring structure, e.g. a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins) and the glycidyl esters of aromatic carboxylic acids. The most preferred aromatic polyepoxides are the polyglycidyl ethers of polyhydric phenols.

Representative examples of aliphatic polyepoxides which can be utilized in the composition of the invention include 3',4'-epoxycyclohexylmethyl-3,4-epoxycyclohexanecarboxylate, 3,4-epoxycyclohexyloxirane, 2-(3',4'-epoxycyclohexyl)-5,IH-spiro-3H4H-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

Representative examples of aromatic polyepoxides which can be utilized in the composition of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-(4-(2,3-epoxypropoxy)phenylpropane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,31-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. Nos. 3,018,262 and 3,298,998, as well as the derivatives described in the Handbook of Epoxy Resins by Lee and Neville, McGraw-Hill Book Co., New York (1967), and mixtures thereof.

A preferred class of polyepoxy compounds are polyglycidyl ethers of polyhydric alcohol, particularly polyphenols. The glycidyl epoxy compounds are generally more reactive toward amines than cycloaliphatic epoxy compounds. In some preferred embodiments, the epoxy compound generally has an epoxy equivalent weight (EW) of between 170 to about 4,000, preferably between 170 and 1,000. The epoxide equivalent weight (EW) is defined as the weight in grams of the epoxy functional compound that contains one gram equivalent of epoxy (oxirane) functional groups.

Epoxy resins may be compounded with the benzoxazine component in amounts of 5 to 25% molar equivalents of epoxy functional groups to moles of benzoxazine functional groups.

Adjuvants may optionally be added to the compositions such as colorants, abrasive granules, anti-oxidant stabilizers, thermal degradation stabilizers, light stabilizers, conductive particles, tackifiers, flow agents, bodying agents, flatting agents, inert fillers, binders, blowing agents, fungicides, bactericides, surfactants, plasticizers, rubber tougheners and other additives known to those skilled in the art. They also can be substantially unreactive, such as fillers, both inorganic and organic. These adjuvants, if present are added in an amount effective for their intended purpose.

Examples of suitable filler materials include silica-based fillers, reinforcement-grade carbon black, clays, and any combination of any of these in any proportions. Such fillers are described in more detail below.

In some embodiments, a toughening agent may be used. The toughening agents which are useful in the present invention are polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell; and elastomeric particles polymerized in situ in the epoxide from free radical polymerizable monomers and a copolymerizable polymeric stabilizer.

Examples of useful toughening agents of the first type include graft copolymers having a polymerized, diene, rubbery backbone or core to which is grafted a shell of an acrylic acid ester or methacrylic acid ester, monovinyl aromatic hydrocarbon, or a mixture thereof, such as disclosed in U.S. Pat. No. 3,496,250 (Czerwinski), incorporated herein by reference. Preferable rubbery backbones comprise polymerized butadiene or a polymerized mixture of butadiene and styrene. Preferable shells comprising polymerized methacrylic acid esters are lower alkyl ($C_1$-$C_4$) substituted methacrylates. Preferable monovinyl aromatic hydrocarbons are styrene, alphamethylstyrene, vinyltoluene, vinylxylene, ethylvinylbenzene, isopropylstyrene, chlorostyrene, dichlorostyrene, and ethylchlorostyrene. It is important that the graft copolymer contain no functional groups that would poison the catalyst.

Examples of useful toughening agents of the second type are acrylate core-shell graft copolymers wherein the core or backbone is a polyacrylate polymer having a glass transition temperature below about 0° C., such as polybutyl acrylate or polyisooctyl acrylate to which is grafted a polymethacrylate polymer (shell) having a glass transition above about 25° C., such as polymethylmethacrylate.

The third class of toughening agents useful in the invention comprises elastomeric particles that have a glass transition temperature ($T_g$) below about 25° C. before mixing with the other components of the composition. These elastomeric particles are polymerized from free radical polymerizable monomers and a copolymerizable polymeric stabilizer that is soluble in the benzoxazine. The free radical polymerizable monomers are ethylenically unsaturated monomers or diisocyanates combined with coreactive difunctional hydrogen compounds such as diols, diamines, and alkanolamines.

Useful toughening agents include core/shell polymers such as methacrylate-butadiene-styrene (MBS) copolymer wherein the core is crosslinked styrene/butadiene rubber and the shell is polymethylacrylate (for example, ACRYLOID KM653 and KM680, available from Rohm and Haas, Philadelphia, Pa.), those having a core comprising polybutadiene and a shell comprising poly(methyl methacrylate) (for example, KANE ACE M511, M521, B11A, B22, B31, and M901 available from Kaneka Corporation, Houston, Tex. and CLEARSTRENGTH C223 available from ATOFINA, Philadelphia, Pa.), those having a polysiloxane core and a polyacrylate shell (for example, CLEARSTRENGTH S-2001 available from ATOFINA and GENIOPERL P22 available from Wacker-Chemie GmbH, Wacker Silicones, Munich, Germany), those having a polyacrylate core and a poly(methyl methacrylate) shell (for example, PARALOID EXL2330 available from Rohm and Haas and STAPHYLOID AC3355 and AC3395 available from Takeda Chemical Company, Osaka, Japan), those having an MBS core and a poly(methyl methacrylate) shell (for example, PARALOID EXL2691A, EXL2691, and EXL2655 available from Rohm and Haas); and the like; and mixtures thereof. Preferred modifiers include the above-listed ACRYLOID and PARALOID modifiers; and the like; and mixtures thereof.

The toughening agent is useful in an amount equal to about 3-35%, preferably about 5-25%, based on the weight of the benzoxazine. The toughening agents of the instant invention add strength to the composition after curing without reacting with the benzoxazine or interfering with curing.

The curable benzoxazine/polyamine/ortho-dihydroxyaryl compositions are useful for coatings, foams, shaped articles, adhesives (including structural and semistructural adhesives), magnetic media, filled or reinforced composites, coated abrasives, caulking and sealing compounds, casting and molding compounds, potting and encapsulating compounds, impregnating and coating compounds, conductive adhesives for electronics, protective coatings for electronics, as primers or adhesion-promoting layers, and other applications that are known to those skilled in the art. When uncured or partially cured, the benzoxazine compositions exhibit pressure-sensitive adhesive properties, including tack. In some embodiments, the present disclosure provides a coated article comprising a substrate, having a cured coating of the benzoxazine thereon.

The compositions may be coated onto substrates at useful thicknesses ranging from 25-1000 micrometers or more. Coating can be accomplished by any conventional means such as roller, dip, knife, or extrusion coating. Solutions of the curable composition may be used to facilitate coating. Stable thicknesses may be necessary to maintain the desired coating thickness prior to curing of the composition by heat and/or acid catalysis.

The benzoxazine composition may also be powder coated by partially curing the benzoxazine compositions, crushing or grinding the partially cured composition to a suitable particle size and fusing to a heated substrate. The powder coatings are prepared by well known methods basically through the steps of pre-mixing the ingredients, melt extrusion of the blend and pulverization. The extruder is preferably a twin screw extruder for this process. The powder is applied by conventional powder coating techniques. Non-limiting examples of powder coating techniques include electrostatic spray coating and fluidized bed coating.

In some embodiments the powder coating may be sprayed onto a heated substrate to fuse and further cure the composition. Electrostatic spray is a useful process for applying powder coatings. An electrostatic spray gun consists essentially of a tube to carry airborne powder to an orifice with an electrode located at the orifice. The electrode is connected to a high-voltage (about 5-100 kv), low-amperage power supply. As the powder particles come out of the orifice they pass through a cloud of ions, called a corona and pick up a negative or positive electrostatic charge. The object to be coated is electrically grounded. The difference in potential attracts the powder particles to the surface of the part. They are attracted most strongly to areas that are not already covered, forming a reasonably uniform layer of powder even on irregularly shaped objects.

The particles cling to the surface strongly enough and long enough for the object to be conveyed to a baking oven, where the powder particles fuse to form a continuous film, flow, and further cured. The powder particles that do not adhere to the object to be coated (overspray) can be recovered and recycled, typically, by blending with virgin powder.

In another embodiment the powder coating may be applied by dipping the heated substrate into a fluidized bed.

Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as polymethyl(meth)acrylate, polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood; and composites of the foregoing materials.

The instant disclosure further provides a pressure sensitive adhesive which comprises a coating of the uncured or partially cured benzoxazine composition on a suitable substrate, such as an adhesive tape backing. A preferred method of preparing a pressure sensitive adhesive article comprises partially curing the novel composition to a useful coating viscosity, coating the partially crosslinked composition onto a substrate (such as a tape backing) and further curing the composition. Useful coating viscosities are generally in the range of 500 to 10,000 cps.

The cured benzoxazine composition may be used as an anticorrosion coating to protect metal substrates. Coatings used to protect metals against corrosion are required to meet several important criteria. They must be durable so as to avoid damage to the coated product during transportation or storage and they must not craze or crack or otherwise fail when subjected to bending or other forms of distortion. Epoxy coatings for metals are well known in the art. They possess excellent abrasion and impact resistance and can be formulated to aggressively adhere to cleaned metal surfaces. Further, they have been found to survive most of the exacting conditions for corrosion protection coatings. However, until recently, even these suffered from insufficient flexibility. This resulted in the need for on-site repair, of gaps or voids in the coating, following installation of protected metal structures. While it has been possible to improve cured epoxy coating flexibility, using combinations of aromatic and aliphatic epoxides, these benefits have been offset by reduction in the rate of cure.

Commonly used epoxy protective coatings of the prior art may be prepared by reacting diglycidyl ethers of dihydric phenols with dihydric phenols and subsequently curing them with appropriate curing agents. Coatings of this type are suitably durable for the majority of applications; however, they are likely to fail if coated metal substrates, such as metal plate, reinforcing rod or pipes are subjected to bending, high temperatures or other forms of distortion. Failure occurs when the coatings crack and provide a channel of access by water or other contaminants which attack the underlying metal.

In one aspect, the present invention provides a coated article comprising a metal substrate comprising a coating of the uncured, partially cured or fully cured benzoxazine composition on at least one surface thereof. The coating composition can be coated on one or both surfaces of the metal substrate and can comprise additional layers, such as bonding, tying, protective, and topcoat layers. The metal substrate can be, for example, at least one of the inner and outer surfaces of a pipe, vessel, conduit, rod, profile shaped article, or tube. The compositions are useful in providing a corrosion protected pipe, vessel, conduit, rod, profile shaped article, or tube that transport or are exposed (on any surface) to fluids at different temperatures and pressures and having different chemical compositions. Layers of the coating can provide corrosion protection to the metal substrate and act as a thermal insulator. Protected articles of the invention also have resistance to chipping (on impact), are flexible enough to allow for bending of the substrate without cracking or delamination, and have improved abrasion resistance. Multilayers of the coating can be coated individually in sequence or simultaneously.

Unexpectedly, the cured benzoxazine layer provides an excellent protective layer, even at elevated temperatures, when coated directly onto a metal surface, such as a steel pipe. Metal surfaces coated with cured benzoxazine composition layers having a dried thickness in the range of 0.02 mm to 300 mm, preferably in the range of 0.5 mm to 5 mm, show superior impact resistance and superior cohesion compared to known conventional coated metal pipes, vessels, conduits, profile shaped articles, rods, or tubes.

Additionally, the cured compositions are advantageous over conventional coatings on metal surfaces in that the benzoxazine compositions have strong bonding ability to without requiring the use of intervening adhesive layers. For example, in some embodiments a pipe, vessel, conduit, rod, profile shaped article, or tube can be directly coated with an benzoxazine composition layer and then overcoated with a thermoplastic topcoat protective/insulative layer, thus providing a two-layer system on a metal substrate showing excellent adhesion to the metal surface and excellent cohesion of the coated layers. This system provides processing and economic advantages. Also, the article of the present invention comprising the benzoxazine coating exhibits improved cathodic disbandment performance at elevated temperatures and impact resistance compared to conventional thermoplastic or thermosetting polymer coated metal substrates. There has been achieved better interlayer adhesion than is known in the art for similar articles.

The benzoxazine coating composition is particular useful as an adhesion promoter for fluoropolymer coatings. Fluoropolymers include, for example, crosslinked fluoroelastomers and semi-crystalline or glassy fluoropolymers. Fluoropolymers are generally of high thermal stability and are particularly useful at high temperatures. They may also exhibit extreme toughness and flexibility at very low temperatures. Many of these fluoropolymers are almost totally insoluble in a wide variety of solvents and are generally chemically resistant. Some have extremely low dielectric loss and high dielectric strength, and may have unique non-adhesive and low friction properties. Fluoroelastomers, particularly the copolymers of vinylidene fluoride with other ethylenically unsaturated halogenated monomers such as hexafluoropropylene, have particular utility in high temperature applications such as seals, gaskets, and linings.

Multi-layer constructions containing a fluoropolymer enjoy wide industrial application. Such constructions find utility, for example, in fuel line hoses and related containers and hoses or gaskets in the chemical processing field. Adhesion between the layers of a multi-layered article may need to meet various performance standards depending on the use of the finished article. However, it is often difficult to establish high bond strengths when one or more of the layers is a fluoropolymer, in part, because of the non-adhesive qualities of fluoropolymers. Various methods have been proposed to address this problem. One approach is to use an adhesive layer or tie layer between the fluoropolymer layer and the second polymer layer. Surface treatments for the fluoropolymer layer, including the use of powerful reducing agents (e.g., sodium naphthalide) and corona discharge, have also been employed to enhance adhesion. In the case of fluoropolymers containing interpolymerized units derived from vinylidene fluoride, exposure of the fluoropolymer to a dehydrofluorinating agent such as a base has been used, as well as polyamine reagents applied to the fluoropolymer surface or incorporated within the fluoropolymer itself. A need still exists for simple, effective means to bond to fluoropolymer containing materials, particularly in a multi-layer constructions.

In one embodiment the benzoxazine composition may be used as an adhesion promoting layer, or bonding layer, between a fluoropolymer layer and a substrate. In one aspect, a multi-layer article includes a first fluoropolymer layer, a substrate, and a benzoxazine bonding layer on a surface of the first fluoropolymer layer and in contact with the substrate. The fluoropolymer can be a fluoroplastic or fluoroelastomer. In another aspect, a process for preparing a multi-layer article includes providing a first fluoropolymer layer, providing a substrate, providing a benzoxazine bonding layer on a surface of the first fluoropolymer layer and in contact with the substrate, and heating the first fluoropolymer layer and the benzoxazine bonding layer, optionally with additional pressure.

Without being bound by theory, it is believed that the benzoxazine composition (comprising the benzoxazine component, the polyamine component and the ortho-dihydroxyaryl compound) cures into the matrix of the fluoropolymer, promoting adhesion between the two layers. As the benzoxazine composition is cured, the phenol (resulting from ring-opening of the benzoxazine by the polyamine) can add to a double bond of the fluoropolymer by addition-dehydrofluorination. The phenolic groups of the ortho-dihydroxyaryl compound may further cure into the fluoropolymer.

The substrate can include a metal or a non-fluorinated polymer, such as a thermoplastic polymer or a thermoplastic elastomer. The non-fluorinated polymer can be a nitrile rubber, an ethylene-propylene-diene monomer rubber, an epichlorohydrin rubber, an ethylene-acrylate copolymer rubber, a polyamide, a polyurethane, a polyolefin, or combinations thereof.

In another aspect, a multi-layer article includes a first fluoropolymer layer, a substrate, and a benzoxazine bonding layer on a surface of the first fluoropolymer layer and in contact with the substrate. The substrate can include a non-fluorinated polymer, a fluoropolymer, or a metal.

The benzoxazine bonding layer provides not only excellent adhesion to the fluoropolymer and substrates, but can also improve sealing of connector parts, joints or gaskets and can increase the amount of force needed to separate the fluoropolymer layer and connector parts or joints.

Improved adhesion between a fluoropolymer layer and a benzoxazine layer can arise from coating the fluoropolymer from a fluoropolymer solution. Fluoropolymer solution can provide excellent adhesion between the fluoropolymers and substrates such as metal and can improve the sealing from connector parts or joints or gaskets. Excellent interlayer adhesion of fluorine-containing polymer such as copolymer of ethylene and tetrafluoroethylene (ETFE) and a terpolymer of tetrafluoroethylene, hexafluoropropylene and vinylidene fluoride (THV) to metallic substrates such as stainless steel can be obtained using the benzoxazine composition. The multi-layer compositions can have unexpected improved interlayer adhesion and sealing or pull-off force between the fluoropolymer inner layer and connector parts.

Suitable fluoropolymers include interpolymerized units derived from a fluorine-containing monomer and, preferably, at least two principal monomers. Examples of suitable candidates for the principal monomer include perfluoroolefins (e.g., tetrafluoroethylene (TFE) and hexafluoropropylene (HFP)), chlorotrifluoroethylene (CTFE), perfluorovinyl ethers (e.g., perfluoroalkyl vinyl ethers and perfluoroalkoxy vinyl ethers), and optionally, hydrogen-containing monomers such as olefins (e.g., ethylene, propylene, and the like), and vinylidene fluoride (VDF). Such fluoropolymers include, for example, fluoroelastomer gums and semi-crystalline fluoroplastics.

When the fluoropolymer is perhalogenated, preferably perfluorinated, it contains at least 50 mole percent (mol %) of its interpolymerized units derived from TFE and/or CTFE, optionally including HFP.

When the fluoropolymer is not perfluorinated, it contains from about 5 to about 90 mol % of its interpolymerized units derived from TFE, CTFE, and/or HFP, from about 5 to about 90 mol % of its interpolymerized units derived from VDF, ethylene, and/or propylene, up to about 40 mol % of its interpolymerized units derived from a vinyl ether.

Suitable perfluorinated vinyl ethers include those of the formula $$CF_2=CFO(R_f^2O)_a(R_f^3O)_bR_f^4, \quad \text{XIV}$$

where $R_f^2$ and $R_f^3$ are the same or are different linear or branched perfluoroalkylene groups of 1-6 carbon atoms; a and b are, independently, 0 or an integer from 1 to 10; and $R_f^4$ is a perfluoroalkyl group of 1-6 carbon atoms.

A preferred class of perfluoroalkyl vinyl ethers includes compositions of the formula:

$$CF_2=CFO(CF_2CFXO)_dR_f^4 \quad \text{XV}$$

wherein X is F or $CF_3$; d is 0-5, and $R_f^4$ is a perfluoroalkyl group of 1-6 carbon atoms.

Most preferred perfluoroalkyl vinyl ethers are those where, in reference to either Formula (XIV) or (XV) above, d is 0 or 1, and $R_f^2$, $R_f^3$, and $R_f^4$ contains 1-3 carbon atoms. Examples of such perfluorinated ethers include perfluoromethyl vinyl ether, perfluoroethyl vinyl ether, and perfluoropropyl vinyl ether.

Other useful perfluorinated monomers include those compounds of the formula:

$$CF_2=CFO[(CF_2)_e(CFZ)_gO]_hR_f^4, \quad \text{XVI}$$

Where $R_f^4$ is a perfluoroalkyl group having 1-6 carbon atoms, e is 1-5, g is 0-5, h is 0-5 and Z is F or $CF_3$. Preferred members of this class are those in which $R_f^4$ is $C_3F_7$, e is 1 or 2, g is 0 or 1, and h is 1.

Additional perfluoroalkyl vinyl ether monomers useful in the invention include those of the formula:

$$CF_2=CFO[(CF_2CCF(CF_3)O)_k(CF_2)_pO(CF_2)_q]C_rF_{2r+1}, \quad \text{XVII}$$

where k is 0-10, p is 1-6, q is 0-3, and r is 1-5. Preferred members of this class include compounds where k is 0 or 1, p is 1-5, q is 0 or 1, and r is 1.

Perfluoroalkoxy vinyl ethers useful in the invention include those of the formula:

$$CF_2=CFO(CF_2)_t[(CF(CF_3)]_u(CF_2O)_wC_rF_{2r+1}, \quad \text{XVIII}$$

wherein t is 1-3, u is 0-1, w is 0-3, and r is 1-5, preferably 1. Specific, representative, examples of useful perfluoroalkoxy vinyl ethers include $CF_2=CFOCF_2OCF_3$, $CF_2=CFOCF_2OCF_2CF_2CF_3$, $CF_2=CFO(CF_2)_3OCF_3$, and $CF_2=CFO(CF_2)_2OCF_3$. Mixtures of perfluoroalkyl vinyl ethers and perfluoroalkoxy vinyl ethers may also be employed.

Perfluoroolefins useful in the invention include those of the formula: $CF_2=CF-R_f^5$, where $R_f^5$ is fluorine or a perfluoroalkyl of 1 to 8, preferably 1 to 3, carbon atoms.

In addition, partially-fluorinated monomers or hydrogen-containing monomers such as olefins (e.g., ethylene, propylene, and the like), and vinylidene fluoride can be used in the fluoropolymer of the invention, when the fluoropolymer is not perfluorinated. One example of a useful fluoropolymer is composed of principal monomer units of tetrafluoroethylene and at least one perfluoroalkyl vinyl ether. In such copolymers, the copolymerized perfluorinated ether units constitute from about 10 to about 50 mol % (more preferably 15 to 35 mol %) of total monomer units present in the polymer.

The fluoropolymers, including fluoroelastomers, may include a cure-site monomer component to facilitate cure in the presence of a catalyst. The cure site component allows one to cure the fluoropolymer. The cure site component can be partially or fully fluorinated. At least one cure site component of at least one fluoropolymer comprises a nitrogen-containing group. Examples of nitrogen-containing groups useful in the cure site monomers of the present invention include nitrile, imidate, amidine, amide, imide, and amine-oxide groups. Useful nitrogen-containing cure site monomers include nitrile-containing fluorinated olefins and nitrile-containing fluorinated vinyl ethers, such as those described in U.S. Pat. No. 6,890,995 (Kolb et al.), incorporated herein by reference.

Another suitable cure site component useful in the present invention is a fluoropolymer or fluorinated monomer material containing a halogen that is capable of participation in a peroxide cure reaction. Such a halogen may be present along a fluoropolymer chain and/or in a terminal position. Typically the halogen is bromine or iodine. Copolymerization is preferred to introduce the halogen in a position along a fluoropolymer chain. In this route, a selection of the fluoropolymer components mentioned above are combined with a suitable fluorinated cure site monomer. Such a monomer can be selected, for example, from the general formula Z—$R_f$—$O_x$—CF=$CF_2$, wherein Z is Br or I, $R_f$ is a substituted or unsubstituted $C_1$-$C_{12}$ fluoroalkylene, which may be perfluorinated and may contain one or more ether oxygen atoms, and x is 0 or 1. When x is 0, examples of the bromo- or iodo-fluoroolefins include: bromodifluoroethylene, bromotrifluoroethylene, iodotrifluoroethylene, 1-bromo-2,2-difluoroethylene, and 4-bromo-3,3,4,4-tetrafluorobutene-1, and the like. When x is 1, examples of the bromo- or iodo-fluorovinyl ethers include: $BrCF_2OCF$=$CF_2$, $BrCF_2CF_2OCF$=$CF_2$, $BrCF_2CF_2CF_2OCF$=$CF_2$, $CF_3CF(Br)CF_2OCF$=$CF_2$, and the like. In addition, non-fluorinated bromo- or iodo-olefins, e.g., vinyl bromide and 4-bromo-1-butene, can be used.

The amount of cure site component in a side chain position of the fluoropolymer is generally from about 0.05 to about 5 mol % (more preferably from 0.1 to 2 mol %). The fluoroelastomers having a cure site monomer component may be cured by the steps of:
a) forming a mixture comprising a fluoropolymer having interpolymerized units derived from cure site monomer, and an onium catalyst; b) shaping the mixture; c) curing the shaped mixture; and optionally d) heat aging the cured mixture.

The fluoropolymer component may include additional optional materials such as reinforcement-grade (reinforcing) filler materials, fluoroplastics in addition to fluoroelastomers, pigments, energy-beam absorbents, antioxidants, stabilizing agents, fillers, oils, processing aids, neutralizers, rheology modifiers, silane coupling agents, flow control agents cross-linking materials (e.g., cross-linking agents, cross-linking co-agents, and cure accelerators), lubricants, flame retardants, flame retardant synergists, antimicrobials, any other additive known in the art, and any combination of these in any proportion. The concentration of these additional materials in the elastomeric composition of the present invention may be any concentration sufficient to provide a desired result.

Reinforcement-grade (reinforcing) filler material may optionally be included in the fluoropolymer composition to enhance the split and tear properties of cold shrinkable articles (formed from the elastomeric composition) at elevated temperatures. Examples of suitable filler materials include silica-based reinforcement filler, reinforcement-grade carbon black, fluoroplastics, clays, and any combination of any of these in any proportions.

As used herein, the term "silica-based reinforcement filler" is defined to include all compounds of the formula $SiO_2$ (e.g., pure silica); all compositions that include at least about ten weight percent of $SiO_2$ and/or an $SiO_2$ derivative, based upon the total weight of the composition; all silicates; and any combination of any of these in any proportion. Examples of suitable silica-based reinforcement fillers include silica (also referred to as silicon dioxide); silane-treated silica; fumed silica (e.g., such as the CABOSIL™ M-5 product commercially from Cabot Corporation of Billerica, Mass.); silane-treated fumed silica such as, for example, the AEROSIL™ R972 product, the AEROSIL™ R974 product, and the AEROSIL™200 product that are all commercially available from Degussa Company of Parsippany, N.J. and the CABOSIL™ line of silane-treated fumed silica products commercially from Cabot Corporation of Billerica, Mass.; silicates; and any combination of any of these in any proportion.

Examples of suitable silicates include calcium silicate (wollastonite), aluminum silicate, and mixtures of these. In some embodiments, the average particle size of the silica-based reinforcement filler may be less than about 30 nanometers (nm). Glasses may be used, including fiberglass filament and mats. In other embodiments, the average particle size of the silica-based reinforcement filler may be as low as about 10 nm and as high as about 20 nm.

The phrase "reinforcement-grade carbon black" as used herein, includes any carbon black with an average particle size smaller than about 40 nm, which corresponds to an average surface area of about 65 $m^2$/g. Some particularly suitable average particle sizes for reinforcement-grade carbon black range from about 9 nm to about 40 nm. Carbon black that is not reinforcement grade include carbon black with an average particle size larger than about 40 nm. Carbon fibers and carbon nanotubes are also contemplated as useful fillers.

In the present disclosure, the polybenzoxazine curable composition is used as an adhesive or primer to produce a multilayered article. The multilayered article comprises a primer layer intimately contacting a substrate and a fluoropolymer layer, such as a fluoroelastomer or perfluoroelastomer layer. In one embodiment, the multilayered article is prepared by the process disclosed below.

In one embodiment, a multilayer coating is prepared by coating a substrate with an uncured, partially cured or fully cured benzoxazine composition, coating the benzoxazine composition with an uncured, partially cured or fully cured fluoropolymer composition, and curing both layers under heat and pressure. As used herein, the term "substrate" means any material suitable for bonding to fluoropolymers such as fluoroelastomers or perfluoroelastomers. Substrates include, for example, various metals (such as for example, aluminum or stainless steel), polymers (such as non-fluorinated and fluorinated, plastics and elastomers), carbon fibers, ceramics (such as glass) and combinations thereof. The polymer substrates include polymers that are stable up to at least 150° C. and include for example, perfluorinated and partially fluorinated polymers, polyimides, etc. The primer composition may be applied to the substrate by techniques known in the art, including for example, dipping, spray coating, pouring, and other methods known in the art.

The benzoxazine coated substrate is then contacted with a fluoropolymer compound. The compounded fluoropolymer or perfluoroelastomer may be in the form of a film, crumb, cord, preform, or powder. The fluoropolymer compound-covered substrate (fluoropolymer compound/primer/substrate) is then heated to a temperature sufficient to cure or fuse the fluoropolymer layer, and is generally at least 100° C. The fluoropolymer compound-covered substrate may be heated in a mold to form a cured and bonded fluoropolymer article. The heating of the fluoropolymer compound-covered substrate cures the fluoropolymer and the benzoxazine curable composition and bonds the layers together to form a bonded multilayered article.

Post-curing may be done to further cure the article. In one embodiment, the cured and bonded fluoropolymer article may be post cured and stay bonded to the substrate at a temperature of at least 150° C.

The primer composition of the present disclosure between the fluoropolymer or perfluoroelastomer compositions and other substrates, when exposed to elevated temperatures, such as for example temperatures of at least 200° C. and maintains adhesive integrity.

EXAMPLES

Materials

Adhesion promoter—a 20:80 blend of catechol novolak resin and phenolic hardener resin, equivalent to the "ACN blend" described in U.S. Pat. No. 6,911,512
Bisphenol A benzoxazine, available under the trade designation Araldite 35600 from Huntsman Chemical, The Woodlands, Tex., USA
Silbond 100 EST filler, from Quarzwerke, Frechen, Germany
MXDA diamine, trade designation for a meta-xylene diamine from Mitsubishi Gas Chemical Co., Inc., Tokyo, Japan
Paraloid 2600, trade designation for a core shell toughener available from The Dow Chemical Company, Midland, Mich., USA)

Example 1

Seven parts by weight of a benzoxazine resin—bisphenol A benzoxazine—were mixed with one part of MXDA diamine and other adjutants as described below to make a compound that was mixed through twin screw extrusion. This mixture was later cured at a higher temperature on a selected substrate. The mixture proportions were as follows:
Part A:
75% Bisphenol A benzoxazine (Araldite 35600)
10% Core shell toughener (Paraloid 2600)
10% Filler (Silbond 100 EST)
5% adhesion promoter (from U.S. Pat. No. 6,911,512)
Part B:
MXDA Diamine The extruder used has a flat temperature profile ranging from 110° C. to 140° C. For this particular example the temperature was 130° C. The screw speed was 100 rpm. The extruder was a 30 mm diameter twin screw extruder model SLJ-30D made by Donghui Powder Processing Equipment Co. of Yantai, China.

Flakes or sheets produced with the extruder/nip system were ground into powder. Cooled extrudate in flake or sheet form was milled using a Strand Mill S102DS Lab Grinder (110 V, 60 Hz from Strand Manufacturing, Hopkins, Minn., USA) and sieved through a 70 mesh screen to obtain a relatively uniform size powder.

The powder was fluidized and used to create a fusion bonded coating. In this instance a hot metal piece or coupon was dipped into a fluidized bed for a few seconds at temperatures at or above 180° C.

The Dynamic Mechanical Analysis data for this material, shown in FIG. 1, indicated that the glass transition temperature Tg for the cured material was 234° C. (as measured during a second scan to 300° C. at 2° C./min.)

The reaction below proceeds at temperatures as low at 180° C. However, the preferred method for fusion bonded coating is to apply the fusion bonded powder on hot metal at 230° C.

A fluidized bed was utilized in the laboratory to dip coat heated coupons of cold rolled steel. The coupons were coated one at a time in the fluidized bed, and typically 4-6 coupons were used in a test run. The steel coupons were grit blasted prior to being coated. These samples were dip coated in the powder prepared above in the fluidized bed for 2 seconds with the plates preheated in an oven to 230° C. A 2 hour postcure at 180° C. was done to ensure full cure. The coated panels, ranging in thickness from 15 to 20 mils (0.38 to 0.51 mm), were tested for cathodic disbondment. This was a 28 day test in which samples were subjected to 65° C. and 180° C., −1.5 volts and 3% NaCl. The preferred disbondment radius at 65° C. would be less than 8 mm. The CSA Z245.20 procedure is the testing standard to be followed. In accordance with this test, the maximum allowable disbondment radius at 65° C. is 8 mm. The results are described below. (The current CSA standard for high temperature coatings lists a specification for cathodic disbondment test results at 95° C., but none for 65° C.)
Cathodic Disbondment Test Results Cathodic disbondment tests according to the Canadian Standards Association's CSA Z245.20 standard were carried at 65° C. in an oven using a voltage of −1.5 V and a solution of deionized water with 3% by weight of NaCl. The duration of the test was 28 days. More deionized water was added if some evaporation took place in the oven. Current levels and voltage were checked every day using a calomel reference electrode (obtained from Amel Instruments, Via San Giovanni Battista de La Salle 4, 20132 Milano, Italy). The electrode was kept in the oven for an hour prior the current check to allow it to equilibrate to the test temperature. Data was collected using a Eurotherm Chessel 6100 A (Invensys Eurotherm USA, Ashburn, Va., USA.) Results: The average disbondment radius for this coating was 3.0+/−0.2 mm. For laboratory samples the Canadian Standards Association's maximum disbondment radius at this temperature is 8.5 mm. (See note above.)
180° C. (High Temperature Test, Custom Modification):

This modified test was designed to simulate a very hot fluid flowing inside of an externally coated and cathodically protected pipe which is exposed to a corrosive medium. A digital hot plate was utilized to control the temperature of the bottom part of each coated steel coupon tested. The temperature of the solution was independently controlled through heat exchange equipment (heating or chilling). There was a coil inside of the glass vessel where the temperature conditioned fluid flowed and exchanged heat with the cell's solution. For this particular set up one small size temperature controller was utilized for each cell; alternatively several cells may be hooked up to the same unit. A cold water condenser was employed to reflux evaporating water back to the cathodic cell. The sample was sealed against the glass cathodic cell by means of a clamp which pressed a high temperature fluoroelastomer O-ring (e.g., material sold under the trade designation Viton by E. I. du Pont de Nemours and Company, Wilmington, Del., USA) against the glass vessel. These seals or o-rings are rated to withstand a continuous temperature of 240° C. These cells were made for these high temperature tests by the 3M Company glass shop in St. Paul, Minn., USA. Two temperature sensors were placed beneath each steel coated sample; one sent a signal to the computer logger and the other to the hot plate's digital controller. Intimate contact of these probes to the steel plate was achieved by means of a spring compressed under the sensor's cavity.

The temperature probe inside of the cell was coated with Teflon so that it did not interfere with any electrochemical process inside of the cell. It was placed at an angle so that it can be lowered as close to the holiday (a hole in the protective coating) as possible. The calomel electrode was also lowered into the cell so that a good part of it was under the solution's level. It is important to point out that the temperature rating for these electrodes is for the entire assembly, which is why they can give rise to problems when using ovens. Therefore, only the electrode tip was immersed in the medium and a great part of the housing was outside of the cell. The rest of the equipment was then set up in a very similar manner as those used for routine cathodic disbondment tests in ovens.

The electrical requirements for each cell of the cathodic disbondment test were provided by an Amel Instruments general purpose potentiostat model 2049. Four cells were run simultaneously and wired to a personal computer. Custom made software controlled the tests and recorded the data. The tests ran for 672 hours (28 days). Recorded continuously were: temperature of the lower part of the coupon (inner surface of pipe), temperature of the solution near the coating's surface (medium surrounding pipe), voltage (kept at −1.5 V using a calomel reference electrode), and current monitored in milliamps.

All holidays were drilled to the same metal depth in order to keep a similar area for all the tested samples. The 3% by weight salt solution was prepared using de-ionized water and reagent grade NaCl (J.T.Baker Chemical Company, Phillipsburg, N.J., USA). Once the test panels were removed from the testing apparatus, they were sliced and pried using a utility knife. An average and a standard deviation were computed from the 8 measured slices. Measurements were made from the holiday's periphery to the start of the radial cut using a digital caliper. Results: The average disbondment radius for this coating was 15.2+/−1.7 mm.

Examples 2-27

Table of Materials

| Acronym | Description |
| --- | --- |
| FC 2299X | 3M ™ Dyneon ™ Ultra High Viscosity Fluoroelastomer FC 2299X, a very high molecular weight hexafluoropropylene/vinylidene fluoride (HFP/VDF) copolymer formulation commercially available from available from 3M Company, Energy and Advanced Materials Division, St. Paul, MN, USA, used in raw gum form. This material is further compounded with carbon black before use, as described below. |
| FC 2123 | 3M ™ Dyneon ™ Fluoroelastomer, a low molecular weight hexafluoropropylene/vinylidene fluoride (HFP/VDF) copolymer formulation with incorporated curatives, commercially available from available from 3M Company, Energy and Advanced Materials Division, St. Paul, MN, USA. This material is further compounded with carbon black before use, as described below. |
| Perfluoro-elastomer | A curable perfluoroelastomer blend prepared as described in Example 1 of U.S. Pat. No. 6,943,228, and described in more detail below. The material is further compounded with carbon black before use, as described below. |
| PFE 06C | 3M ™ Dyneon ™ PFE 06C Fluoroelastomer, available from 3M Company, Energy and Advanced Materials Division, St. Paul, MN, USA |
| PFE 02C | 3M ™ Dyneon ™ PFE 02C Fluoroelastomer, available from 3M Company, Energy and Advanced Materials Division, St. Paul, MN, USA |
| R972 | Aerosil R972 Silica, available from Evonik Degussa Corporation Inorganic Materials, Parsippany, NJ, USA |
| MEK | methyl ethyl ketone (2-butanone,) available from Sigma-Aldrich Corporation, St. Louis, MO, USA |
| BisABZ | Bisphenol A benzoxazine, available under the trade designation Araldite 35600 from Hunstman Chemical, The Woodlands, Texas, USA |
| Adhesion promoter | an ortho-dihydroxyaryl component consisting of a 20:80 blend of catechol novolak resin and phenolic hardener resin, equivalent to the "ACN blend" described in U.S. Pat. No. 6,911,512 |
| Silbond 100 EST | Silbond 100 EST filler, from Quarzwerke, Frechen, Germany |
| MXDA | MXDA diamine, trade designation for a meta-xylene diamine from Mitsubishi Gas Chemical Co., Inc., Tokyo, Japan |
| DICY | Dicyandiamide, available from The Chemical Company, Jamestown, RI, USA |
| ABA | Aminobenzylamine, available from Sigma-Aldrich Corporation, St. Louis, MO, USA |
| core shell toughener | Paraloid 2600, trade designation for a core shell toughener available from The Dow Chemical Company, Midland, Michigan, USA |
| N-990 MT Carbon Black | N-990 MT Carbon Black, manufactured by Cancarb, Alberta, Canada |
| bisphenol AF | 4,4'-(Hexafluoroisopropylidene)diphenol, available from Sigma-Aldrich Corporation, St. Louis, MO, USA |
| CHEMLOK 5150 | 3-aminopropyltriethoxysilane, vinyltrimethoxysilane and benzyltriphenylphosphonium chloride. Available from, Lord Corporation, Cary, NC, USA. |
| N-550 FEF Carbon Black | Carbon Black N550 Fast Extrusion Furnace Black, available from Cabot Corporation, headquarters in Boston, MA, USA |
| MgO | Magnesium Oxide, available from Sigma-Aldrich Corporation, St. Louis, MO, USA |
| Ca(OH)$_2$ | Calcium hydroxide, available from Sigma-Aldrich Corporation, St. Louis, MO, USA |
| BTPPC | benzyltriphenylphosphonium chloride, available from Sigma-Aldrich Corporation, St. Louis, MO, USA |

Curable Composition Formulation

C-CUR—Comparative curable composition C-CUR was compounded in a process similar to that described in Example 1 above. To one equivalent (231 g) of BisABZ (Bisphenol A benzoxazine, Araldite 35600) were added 1 NH equivalent of diamine MXDA (34 g), plus 10 wt. % (33.1 g) of core shell toughener (Paraloid 2600), and 10 wt. % (33.1 g) of filler (Silbond 100 EST). Thus the (231 g+34 g=331 g) of (Bis- ABZ+MXDA) make up 80 wt. % of the final composition. No catechol-based adhesion promoter was included in C-CUR. All the ingredients were mixed together under nitrogen and/or elevated (110-130° C.) temperature. The composition was either allowed to cool to room temperature or, if mixed under $N_2$ at room temperature, allowed to advance overnight under $N_2$. The material was then ground into powder and fed into a twin screw extruder operating at 100-300 rpm in the 120-130° C. range as in Example 1. The extruded material was ground into powder and sifted to the desired (stated) particle size. This curable composition was later applied to the selected substrate as a 20 wt. % suspension in MEK.

CUR-1—This material was prepared as C-CUR above, but with 5 wt. % catechol-based adhesion promoter (from U.S. Pat. No. 6,911,512) added. Thus, the formulation was 75 wt. % combined BisABZ and MDXA amine (231 g and 34 g, respectively, implying a total sample mass of 353), 10 wt. % (35.3 g) core shell toughener (Paraloid 2600), 10 wt. % (35.3 g) filler (Silbond 100 EST), and 5 wt. % (17.7 g) catechol-based adhesion promoter (from U.S. Pat. No. 6,911,512). In this and all CUR formulations below, the amine was present at 1 N—H to 1 benzoxazine molar ratio in the final compounded formulation. This and the CUR curable compositions below were applied to the selected substrate as a 20 wt. % suspension in MEK.

CUR-2—This material was prepared as in CUR-1 above, except that the amine was 90% dicyandiamide (DICY) and 10% aminobenzylamine (ABA) and the component weights were adjusted to keep the sum of the BisABZ and amine at 75 wt. % of the total mixture, with the amine present at a 1 N—H to 1 benzoxazine molar ratio.

CUR-3—This material was prepared as in CUR-1 above, except that the amine was 100% DICY.

CUR-4—This material was prepared as in CUR-2 above, except that the particle size was 500 micrometers in diameter or larger.

CUR-5—This material was prepared as in CUR-1 above, except that the amine was a 2:1 mixture of DICY:MXDA.

Perfluoroelastomer Preparation

A perfluoroelastomer polymer latex was produced generally as described in U.S. Pat. No. 6,890,995, and more specifically described in Example 1 of U.S. Pat. No. 6,943,228, with the exception that no aqueous perfluoroalkyoxy copolymer (PFA) dispersion was added. This latex was coagulated with magnesium chloride, washed and dried. To form a rubber material, 98 parts by weight of this dried polymer was combined with 1.2 parts of PFE 06C, 2.5 parts of PFE 02C, and 1.5 parts of R972 silica.

Fluoropolymer Compounding

FC 2299X

To provide fluoropolymer samples for testing, 100 parts by weight of FC 2299X was compounded on a two roll mill with: 30 parts by weight ASTM designated N-990 MT carbon black (manufactured by Cancarb, Alberta, Canada); MgO, 3 parts by weight; Ca(OH)$_2$, 6 parts by weight; bisphenol AF, 2 parts by weight; and benzyltriphenylphosphonium chloride (BT-PPC) 0.67 parts by weight.

FC 2123

100 parts by weight of FC 2123 curable fluoropolymer formulation was compounded on a two roll mill with: N-990 MT Carbon Black, 30 parts by weight; MgO, 3 parts by weight; and Ca(OH)$_2$ 6 parts by weight.

Perfluoroelastomer 100 parts by weight of the perfluoroelastomer latex mixture prepared above was compounded on a two roll mill with: N-990 MT Carbon Black, 10 parts by weight; and N-550 FEF Carbon Black, 8 parts by weight.

Testing Procedures

The curable adhesive/primer compositions were tested for adhesion according to ASTM D-429 Method B. Aluminum 6061 type coupons (2.54 cm×6.35 cm×0.15 cm) (obtained from Loftech Prototype Manufacturing, LLC., St. Paul, Minn.) were grit blasted with 60 grit aluminum oxide, rinsed in cold water, solvent degreased in MEK, cold water rinsed, cleaned with an aluminum cleaner (available under the trade designation "Oakite Aluminum Cleaner 164" from Oakite Products Inc., Berkeley Heights, N.J.), cold water rinsed, deoxidized with a product available under the trade designation "Oakite Deoxidizer LNC") from Oakite Products Inc., Berkeley Heights, N.J., rinsed in cold water and air dried. Four drops of the curable adhesive/primer compounds to be tested were applied to the center 2.54 cm×3.81 cm of the cleaned aluminum coupon and allowed to air dry.

The milled, uncured fluoropolymer compound was cut to about a 2 cm×6 cm film (about 14 grams) and laid over the primed and dried aluminum coupons. The fluoropolymer was then compression molded to the primed aluminum coupon, under the conditions shown in the table below. 90° Peel Strength testing according to ASTM D-429, Method B was performed on the molded coupons after cooling to room temperature. Adhesion testing according to ASTM D-429, Method B was also performed on some of the molded coupons after post curing for 16 hours at various temperatures as shown in the table. Results for the peel strength tests are summarized in the tables below.

Examples 2-12 and Comparative Examples C-1 to C-4

Adhering FC 2299X to Metal

Examples of bonding the above-compounded fluoropolymer composition FC 2299× to aluminum or stainless steel using the listed adhesive/primer curable composition were prepared and tested as described above. Type 304 stainless steel coupons were obtained from Classic Manufacturing Co., Oakdale, Minn., USA, and were prepared in a manner similar to the aluminum, according to ASTM D-429, Method B. Cure and Post Cure conditions are listed in the notation 30'@330° F. (30 minutes at 330° F.) or 16 h@390° F. (16 hours at 390° F.) Results of the ASTM D-429, Method B, 90° Peel Strength Test are listed in units of pounds (force) per linear inch (pli). One pli=175.127 N/m. A key to the codes for failure types is provided with the table. The preferred failure mode is 100% of the failure within the rubbery fluoroelastomer material, or 100R. Chemlok 5150 is an industry standard adhesive for fluoroelastomers, an amino/vinyl silane type material.

TABLE 1

Adhering compounded fluoropolymer composition FC 2299X to metals using benzoxazine-polyamine-ortho-dihydroxyaryl curable compositions.

| Example | Primer | Metal | Cure Conditions | Post Cure | 90° Peel Strength pli | Failure Type |
|---|---|---|---|---|---|---|
| C-1 | C-CUR | Aluminum | 30'@330° F. | None | 45 | 100R |
| 2 | CUR-1 | Aluminum | 10'@390° F. | None | 48 | 100R |
| 3 | CUR-1 | Aluminum | 30'@330° F. | None | 44 | 100R |
| 4 | CUR-1 | Aluminum | 30'@330° F. | 16 h@390° F. | 36 | 100R |
| 5 | CUR-1 | Aluminum | 30'@330° F. | 16 h@450° F. | 34 | 100R |
| 6 | CUR-1 | Aluminum | 30'@330° F. | 16 h@482° F. | 25 | 100R |
| 7 | CUR-1 | Stainless Steel | 30'@330° F. | None | 52 | 100R |
| 8 | CUR-1 | Stainless Steel | 30'@330° F. | 16 h@390° F. | 49 | 100R |
| 9 | CUR-2 | Aluminum | 10'@390° F. | None | 47 | 100R |
| 10 | CUR-3 | Aluminum | 10'@390° F. | None | 46 | 100R |
| 11 | CUR-4 | Aluminum | 10'@390° F. | None | 49 | 100R |
| 12 | CUR-5 | Aluminum | 10'@390° F. | None | 40 | 50R, 50PR |
| C-2 | Chemlok 5150 | Aluminum | 30'@330° F. | None | 27 | 100PR |
| C-3 | Chemlok 5150 | Aluminum | 30'@330° F. | 16 h@390° F. | 28 | 30R, 70PR |
| C-4 | Chemlok 5150 | Aluminum | 30'@330° F. | 16 h@482° F. | 30 | 50R, 50PR |

Failure Type
R = Rubber
P = Primer
M = Metal
PR = Primer to Rubber
PM = Primer to Metal
Number = % type of failure Examples 13-17 and Comparative Example C-5

Adhering FC 2123 to Aluminum

Examples of bonding the above-compounded fluoropolymer composition FC 2123 to aluminum using the listed adhesive/primer curable composition were prepared and tested as described above. The results are shown in Table 2 below. The same terminology is used as for Table 1 above.

TABLE 2

Adhering compounded fluoropolymer composition FC 2123 to aluminum using benzoxazine-polyamine-ortho-dihydroxyaryl curable compositions.

| Example | Primer | Metal | Cure Conditions | Post Cure | 90° Peel Strength pli | Failure Type |
|---|---|---|---|---|---|---|
| C-5 | C-CUR | Aluminum | 30'@330° F. | None | 25 | 100PR |
| 13 | CUR-1 | Aluminum | 10'@390° F. | None | 55 | 100R |
| 14 | CUR-2 | Aluminum | 10'@390° F. | None | 22 | 100PR |
| 15 | CUR-3 | Aluminum | 10'@390° F. | None | 17 | 100PR |
| 16 | CUR-4 | Aluminum | 10'@390° F. | None | 13 | 100PR |
| 17 | CUR-5 | Aluminum | 10'@390° F. | None | 0 | 100PR |

Examples 18-27 and Comparative Example C-6

Adhering Perfluoroelastomer to Aluminum

Examples of bonding the above-compounded Perfluoroelastomer to aluminum using the listed adhesive/primer curable composition were prepared and tested as described above. The results are shown in Table 3 below. The same terminology is used as for Table 1 above.

TABLE 3

Adhering the compounded Perfluoroelastomer to aluminum using benzoxazine-polyamine-ortho-dihydroxyaryl curable compositions.

| Example | Primer | Metal | Cure Conditions | Post Cure | 90° Peel Strength pli | Failure Type |
|---|---|---|---|---|---|---|
| C-6 | C-CUR | Aluminum | 30'@330° F. | None | 12 | 100PR |
| 18 | CUR-1 | Aluminum | 10'@390° F. | None | 1 | 100PR |
| 19 | CUR-2 | Aluminum | 30'@330° F. | None | 11 | 100PR |
| 20 | CUR-2 | Aluminum | 10'@390° F. | None | 20 | 50R, 50PR |
| 21 | CUR-2 | Aluminum | 10'@390° F. | None | 21 | 10R, 90PR |

TABLE 3-continued

Adhering the compounded Perfluoroelastomer to aluminum using benzoxazine-polyamine-ortho-dihydroxyaryl curable compositions.

| Example | Primer | Metal | Cure Conditions | Post Cure | 90° Peel Strength pli | Failure Type |
|---|---|---|---|---|---|---|
| 22 | CUR-2 | Aluminum | 30'@330 to 390° F. | None | 13 | 100PR |
| 23 | CUR-2 | Aluminum | 10'@390° F. | 16 h@390° F. | 17 | 100PR |
| 24 | CUR-2 | Aluminum | 10'@390° F. | 16 h@482° F. | 11 | 100PR |
| 25 | CUR-3 | Aluminum | 10'@390° F. | None | 11 | 100PR |
| 26 | CUR-4 | Aluminum | 10'@390° F. | None | 12 | 100PR |
| 27 | CUR-5 | Aluminum | 10'@390° F. | None | 19 | 100PR |

This application provides the following illustrative embodiments:

1. A curable composition comprising:
   a) a polybenzoxazine,
   b) a polyamine
   c) an ortho-dihydroxyaryl component, and
   d) an optional acid catalyst.
2. The curable composition of embodiment 1 wherein the polybenxoxazine is derived from an aromatic amine.
3. The curable composition of embodiment 1 wherein the polybenzoxazine compound is of the formula:

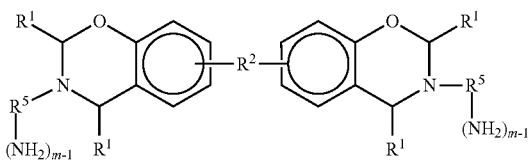

each of $R^1$ is H or an alkyl group;
$R^2$ is H, a covalent bond, or a divalent (hetero)hydrocarbyl group;
m is 1-6, and $R^5$ is the (hetero)hydrocarbyl group.
4. The polybenzoxazine of embodiment 3 where $R^5$ is an aryl group and m is 1.
5. The curable composition of embodiment 1 wherein the polybenzoxazine is of the formula:

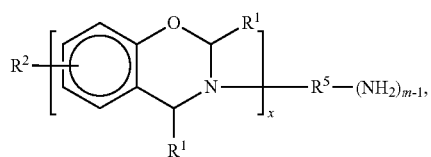

wherein
each of $R^1$ is H or an alkyl group;
$R^2$ is H, a covalent bond, or a polyvalent (hetero)hydrocarbyl group;
$R^5$ is the (hetero)hydrocarbyl residue of a primary amino compound having a valence of x,
m is 1-6; and
x is at least 2.
6. The curable composition of any of the previous embodiments, wherein said amine is of the formula:

$R^{10}(NHR^9)_p$, wherein $R^{10}$ is (hetero)hydrocarbyl group;
p is 1 to 6, and each $R^9$ is H or a hydrocarbyl group.

7. The curable composition of any of the previous embodiments, wherein the molar ratio of amine equivalents of the polyamine compound to the benzoxazine groups is from 1:2 to 2:1.
8. The curable composition of any of the previous embodiments wherein the ortho-dihydroxy aryl component is present between 0.5% and 20% by wt of the total composition.
9. The curable composition of any of the previous embodiments, further comprising a superacid catalyst.
10. The curable composition of any of the previous embodiments further comprising an epoxy resin.
11. The curable composition of embodiment 10 wherein the epoxy resin is present in amounts of 5 to 25% molar equivalents of epoxy functional groups relative to moles of benzoxazine functional groups.
12. The curable composition of any of the previous embodiments further comprising a toughening agent.
13. The curable composition of any of the previous embodiments further comprising a particulate filler.
14. The curable composition of any of the previous embodiments wherein the polyamine is an amidine compound having at least two amine equivalents.
15. The curable composition of embodiment 14 wherein the amidine compound is of the general formulae:

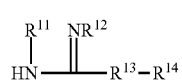

XV wherein
each $R^1$ is independently an alkyl group of 1 to 14 carbon atoms, a cycloalkyl group of 3 to 12 carbon atoms, or an aryl group of 5 to 12 ring atoms,
each $R^{12}$ is H of $C_1$-$C_4$ alkyl;
each $R^{13}$ is an $C_1$-$C_{12}$ alkylene or an arylene of 5 to 12 ring atoms, and
$R^{14}$ is H or a functional group selected from amide, ester, nitrile, nitro, sulfide, sulfoxide, sulfone, disulfide, azide, isothiocyanate, amine, hydroxyl, mercaptan, ether, urethane, quaternary ammonium and phosphonium, halogen, silyl, silyloxy, wherein the functional groups are substituted with hydrogen or alkyl or aryl groups.
16. The curable composition of any of the previous embodiments wherein the polyamine is a guanidine compound having at least two amine equivalents.

17. The curable composition of embodiment 16 wherein the guanidine is of the formula:

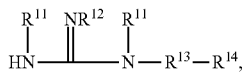

XVI wherein
- each $R^1$ is independently an alkyl group of 1 to 14 carbon atoms, a cycloalkyl group of 3 to 12 carbon atoms, or an aryl group of 5 to 12 ring atoms,
- each $R^{12}$ is H of $C_1$-$C_4$ alkyl;
- each $R^{13}$ is an $C_1$-$C_{12}$ alkylene or an arylene of 5 to 12 ring atoms, and
- $R^{14}$ is H or a functional group selected from amide, ester, nitrile, nitro, sulfide, sulfoxide, sulfone, disulfide, azide, isothiocyanate, amine, hydroxyl, mercaptan, ether, urethane, quaternary ammonium and phosphonium, halogen, silyl, silyloxy, wherein the functional groups are substituted with hydrogen or alkyl or aryl groups.

18. The curable composition of any of the previous embodiments wherein the ortho-dihydroxy aryl component is present between 0.5% and 20% by weight of the total composition 19. An article comprising a metallic substrate and the cured coating of any of the previous embodiments on the surface thereof.

20. The article of embodiment 19 further comprising a fluoropolymer layer bonded to the cured coating of claim 1.

21. The article of embodiment 19 wherein the fluoropolymer layer further comprises a filler.

What is claimed is:

1. A curable composition comprising:
   a) a polybenzoxazine,
   b) a polyamine
   c) an ortho-dihydroxyaryl component, and
   d) an optional acid catalyst.

2. The curable composition of claim 1 wherein the polybenxoxazine is derived from an aromatic amine.

3. The curable composition of claim 1 wherein the polybenzoxazine compound is of the formula:

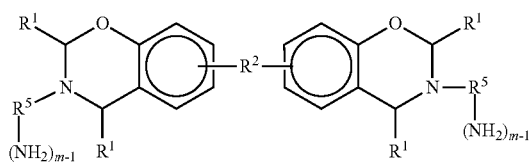

each of $R^1$ is H or an alkyl group;
$R^2$ is H, a covalent bond, or a divalent (hetero)hydrocarbyl group;
m is 1-6, and $R^5$ is the (hetero)hydrocarbyl group.

4. The polybenzoxazine of claim 3 where $R^5$ is an aryl group and m is 1.

5. The curable composition of claim 1 wherein the polybenzoxazine is of the formula:

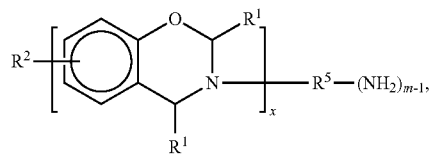

wherein
each of $R^1$ is H or an alkyl group;
$R^2$ is H, a covalent bond, or a polyvalent (hetero)hydrocarbyl group;
$R^5$ is the (hetero)hydrocarbyl residue of a primary amino compound having a valence of x,
m is 1-6; and
x is at least 2.

6. The curable composition of claim 1, wherein said amine is of the formula:

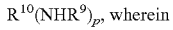

$R^{10}(NHR^9)_p$, wherein $R^{10}$ is (hetero)hydrocarbyl group;
p is 1 to 6, and each $R^9$ is H or a hydrocarbyl group.

7. The curable composition of claim 1, wherein the molar ratio of amine equivalents of the polyamine compound to the benzoxazine groups is from 1:2 to 2:1.

8. The curable composition of claim 1 wherein the ortho-dihydroxy aryl component is present between 0.5% and 20% by wt of the total composition.

9. The curable composition of claim 1, further comprising a superacid catalyst.

10. The curable composition of claim 1 further comprising an epoxy resin.

11. The curable composition of claim 10 wherein the epoxy resin is present in amounts of 5 to 25% molar equivalents of epoxy functional groups relative to moles of benzoxazine functional groups.

12. The curable composition of claim 1 further comprising a toughening agent.

13. The curable composition of claim 1 further comprising a particulate filler.

14. The curable composition of claim 1 wherein the polyamine is an amidine compound having at least two amine equivalents.

15. The curable composition of claim 14 wherein the amidine compound is of the general formulae:

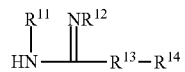

XV wherein
- each $R^1$ is independently an alkyl group of 1 to 14 carbon atoms, a cycloalkyl group of 3 to 12 carbon atoms, or an aryl group of 5 to 12 ring atoms,
- each $R^{12}$ is H of $C_1$-$C_4$ alkyl;
- each $R^{13}$ is an $C_1$-$C_{12}$ alkylene or an arylene of 5 to 12 ring atoms, and
- $R^{14}$ is H or a functional group selected from amide, ester, nitrile, nitro, sulfide, sulfoxide, sulfone, disulfide, azide, isothiocyanate, amine, hydroxyl, mercaptan, ether, urethane, quaternary ammonium and phosphonium, halogen, silyl, silyloxy, wherein the functional groups are substituted with hydrogen or alkyl or aryl groups.

16. The curable composition of claim 1 wherein the polyamine is a guanidine compound having at least two amine equivalents.

17. The curable composition of claim 16 wherein the guanidine is of the formula:

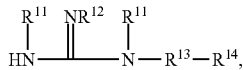

XVI wherein each $R^1$ is independently an alkyl group of 1 to 14 carbon atoms, a cycloalkyl group of 3 to 12 carbon atoms, or an aryl group of 5 to 12 ring atoms, each $R^{12}$ is H of $C_1$-$C_4$ alkyl;

each $R^{13}$ is an $C_1$-$C_{12}$ alkylene or an arylene of 5 to 12 ring atoms, and $R^{14}$ is H or a functional group selected from amide, ester, nitrile, nitro, sulfide, sulfoxide, sulfone, disulfide, azide, isothiocyanate, amine, hydroxyl, mercaptan, ether, urethane, quaternary ammonium and phosphonium, halogen, silyl, silyloxy, wherein the functional groups are substituted with hydrogen or alkyl or aryl groups.

18. The curable composition of claim 1 wherein the ortho-dihydroxy aryl component is present between 0.5% and 20% by weight of the total composition.

19. An article comprising a metallic substrate and the cured coating of claim 1 on the surface thereof.

20. The article of claim 19 further comprising a fluoropolymer layer bonded to the cured coating of claim 1.

21. The article of claim 19 wherein the fluoropolymer layer further comprises a filler.

22. The curable composition of claim 1 wherein the ortho-dihydroxy aryl component is a polycatechol.

* * * * *